(12) United States Patent
Wespel et al.

(10) Patent No.: US 10,915,183 B2
(45) Date of Patent: Feb. 9, 2021

(54) AUTOMATIC LANGUAGE SELECTION IN MESSAGING APPLICATION

(71) Applicant: Avast Software s.r.o., Prague (CZ)

(72) Inventors: Thomas Wespel, Mietingen (DE); Rajarshi Gupta, Sunnyvale, CA (US)

(73) Assignee: Avast Software s.r.o., Prague (CZ)

( * ) Notice: Subject to any disclaimer, the term of this patent is extended or adjusted under 35 U.S.C. 154(b) by 95 days.

(21) Appl. No.: 15/942,360

(22) Filed: Mar. 30, 2018

(65) Prior Publication Data

US 2019/0302897 A1     Oct. 3, 2019

(51) Int. Cl.
| | |
|---|---|
| *G06F 3/023* | (2006.01) |
| *H04W 4/14* | (2009.01) |
| *G06F 3/0482* | (2013.01) |
| *G06F 3/0488* | (2013.01) |
| *G06F 40/58* | (2020.01) |
| *G06F 40/263* | (2020.01) |

(52) U.S. Cl.
CPC .......... *G06F 3/0237* (2013.01); *G06F 3/0482* (2013.01); *G06F 3/04886* (2013.01); *G06F 40/263* (2020.01); *G06F 40/58* (2020.01); *H04W 4/14* (2013.01)

(58) Field of Classification Search
CPC .......... G06F 17/20; G06F 17/30; G06F 16/20; G06F 16/30; G06F 3/04; G06F 40/58; G06F 3/0237; G06F 40/263; G06F 3/0482; G06F 3/04886; G06F 3/04895; H04W 4/14; H04W 4/029; G06Q 10/107
See application file for complete search history.

(56) References Cited

U.S. PATENT DOCUMENTS

| | | | |
|---|---|---|---|
| 2001/0029455 A1* | 10/2001 | Chin | G06F 40/58 704/277 |
| 2008/0070604 A1* | 3/2008 | Castagnet | G06F 3/0237 455/466 |
| 2009/0024595 A1 | 1/2009 | Chen | |
| 2009/0083028 A1* | 3/2009 | Davtchev | G06F 40/232 704/9 |
| 2009/0083243 A1 | 3/2009 | Heymans et al. | |
| 2009/0170536 A1* | 7/2009 | Rang | G06F 3/0237 455/466 |
| 2009/0254345 A1 | 10/2009 | Fleizach et al. | |

(Continued)

OTHER PUBLICATIONS

International Search Report dated Jun. 28, 2019 for PCT/US19/24765.

*Primary Examiner* — Sanchita Roy
(74) *Attorney, Agent, or Firm* — Dovas Law, P.C.

(57) ABSTRACT

An electronic messaging method is provided, the method implemented by one or more processors. The method includes launching a textual communication application by a user device including a user interface. In the user interface a data entry interface is enabled including language elements in a particular language determined based on an international calling code of a stored textual communication involving a user of the user device or a language of a stored textual communication involving a user of the user device, the stored textual communication comprising text transmitted by the user device or text received by the user of the user device from a particular party. Textual input is received via the data entry interface including the language elements in the particular language.

33 Claims, 9 Drawing Sheets

(56) References Cited

U.S. PATENT DOCUMENTS

| | | | |
|---|---|---|---|
| 2009/0327948 A1* | 12/2009 | Penttinen | H04M 1/72552 |
| | | | 715/780 |
| 2010/0030549 A1 | 2/2010 | Lee et al. | |
| 2012/0035914 A1* | 2/2012 | Brun | G06F 40/263 |
| | | | 704/9 |
| 2012/0253785 A1* | 10/2012 | Hamid | G06F 40/58 |
| | | | 704/4 |
| 2012/0290286 A1* | 11/2012 | Davtchev | G06F 40/53 |
| | | | 704/3 |
| 2014/0035823 A1* | 2/2014 | Khoe | G06F 40/232 |
| | | | 345/171 |
| 2014/0267045 A1* | 9/2014 | Grieves | G06F 40/242 |
| | | | 345/168 |
| 2014/0281944 A1* | 9/2014 | Winer | G06F 40/242 |
| | | | 715/259 |
| 2016/0103813 A1 | 4/2016 | Liensberger | |

* cited by examiner

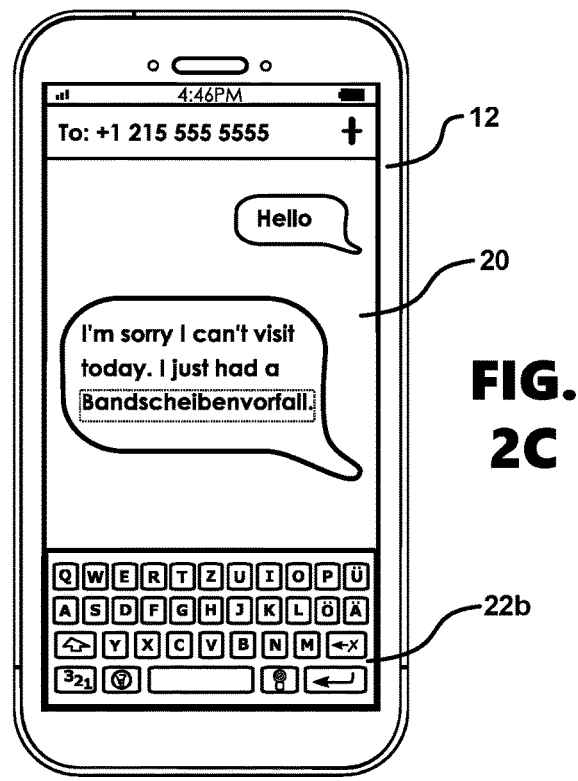
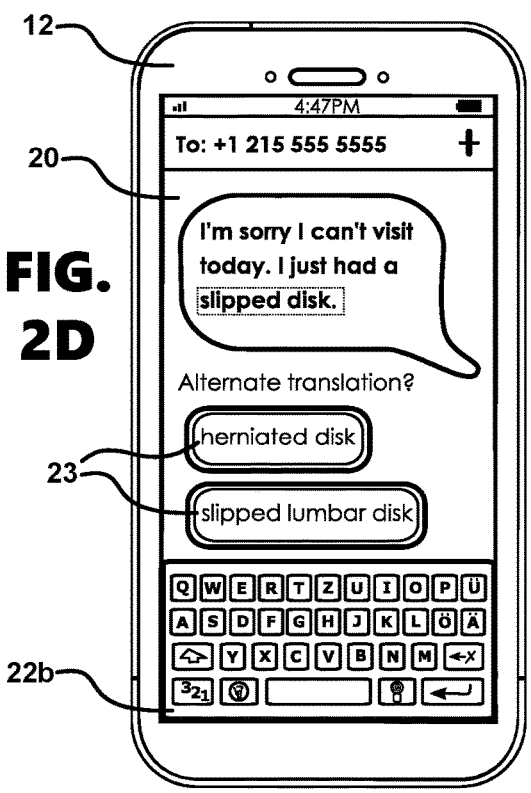
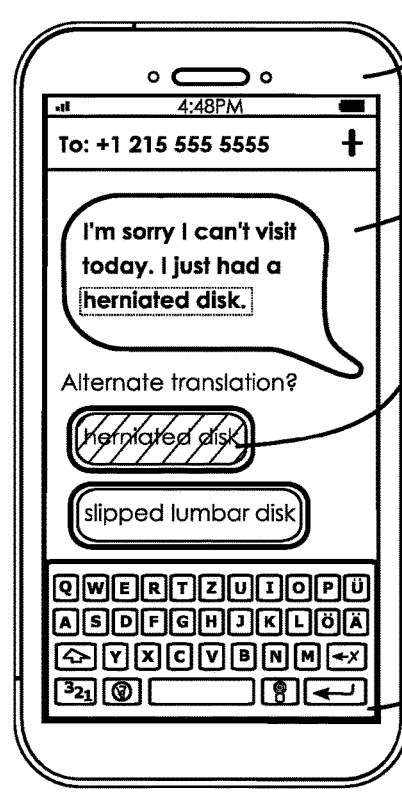

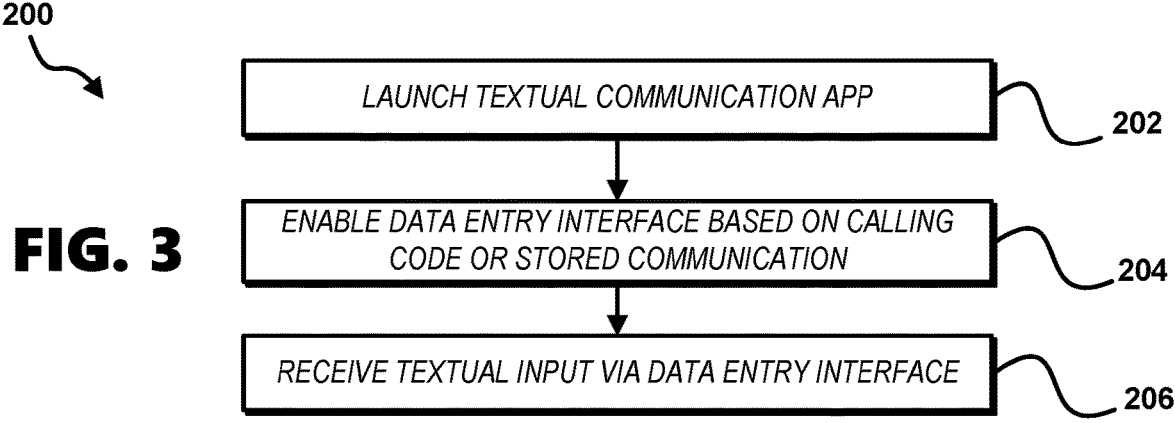
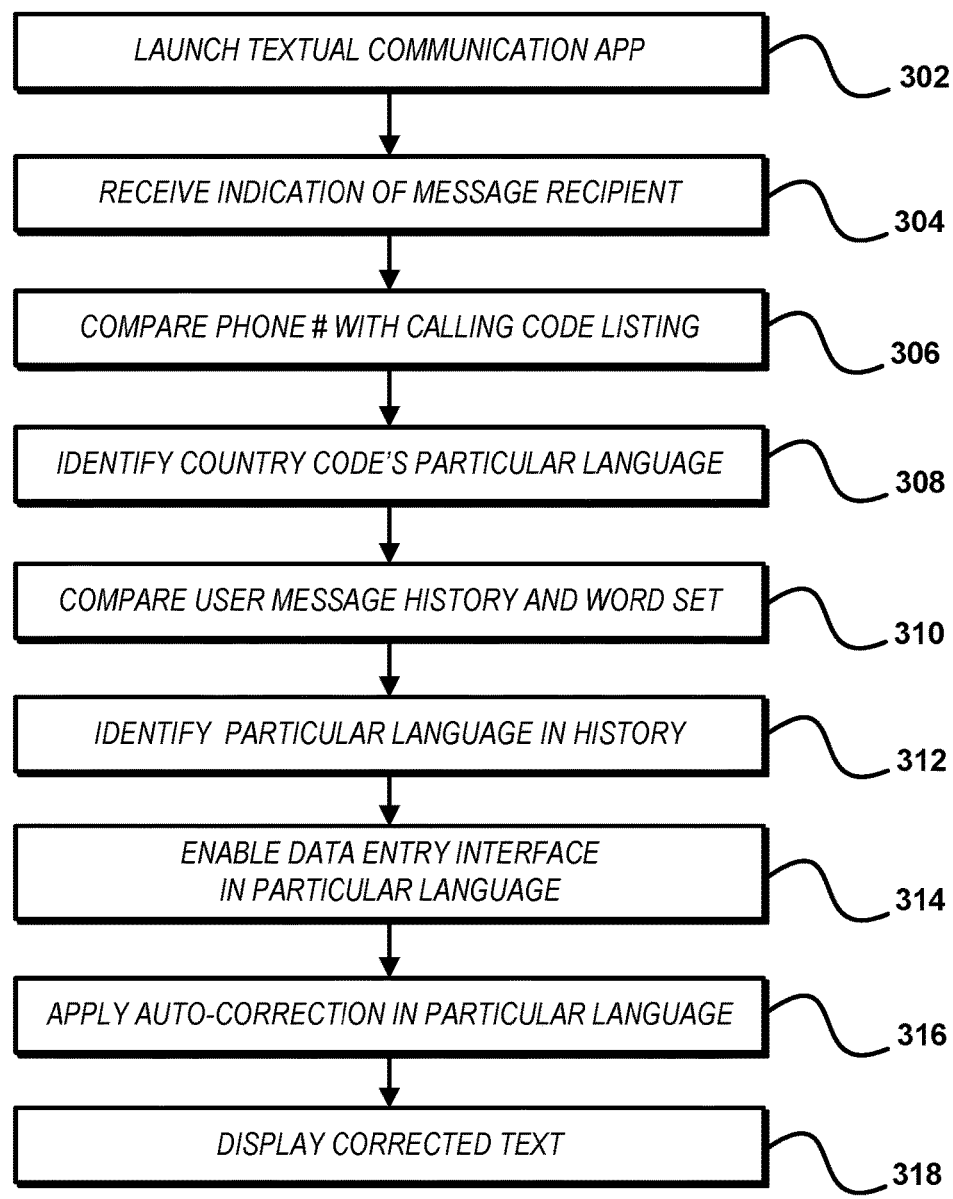

AUTOMATIC LANGUAGE SELECTION IN MESSAGING APPLICATION

FIELD OF INVENTION

The invention relates generally to electronic messaging, and more particularly to electronic messaging systems implementing auto-correction or auto-translate for input text.

BACKGROUND

Personal computing devices such as laptop computers, smart phones, and tablet computers generally support text message functionality over many different messaging platforms. Short Message Service ("SMS"), email, and wide variety of proprietary and open standard messaging protocols enable convenient communication between electronic device users. A useful feature of many messaging platforms is the support for automatic correction ("auto-correction") of misspelled or unrecognized words input by a user. Another useful feature supported is auto-complete, in which a messaging platform predicts what word a user is in the process of inputting (e.g., typing) and suggests or automatically inserts a predicted word before a user has finished inputting the characters in the word.

Auto-correction and auto-completion features may become troublesome or annoying to a user when an auto-correction or an auto-completion renders text which does not reflect the user's desired wording. Auto-correction and auto-complete may be particularly troublesome to users who tend to communicate in more than one language. While messaging protocols are generally configurable for communication in more than one language, switching languages may be inconvenient or impractical. A user trying to type a message for example including words in more than one language is likely to be stymied by auto-correction and auto-completion functionality.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

An electronic messaging method is provided, the method implemented by one or more processors. The method includes launching a textual communication application by a user device including a user interface. In the user interface a data entry interface is enabled including language elements in a particular language determined based on an international calling code of a stored textual communication involving a user of the user device or a language of a stored textual communication involving a user of the user device, the stored textual communication comprising text transmitted by the user of the user device or text received by the user of the user device from a particular party. Textual input is received via the data entry interface including the language elements in the particular language.

In another provided electronic messaging method implemented by one or more processors, textual input is received by a user device from a user via a user interface of the user device and a term is identified from a particular language in the textual input. A data entry interface is enabled in the user interface including language elements in the particular language, and the textual input is received via the data entry interface including the language elements in the particular language.

An electronic messaging system is further provided. The electronic messaging system comprises a user device including one or more hardware processor and one or more non-transitory computer-readable storage medium coupled to the one or more hardware processor and stores programming instructions for execution by the one or more hardware processor, wherein the programming instructions, when executed, cause the user device to perform operations. The operations include receiving textual input via a user interface of the user device and accessing a first word set including terms from a plurality of languages. The textual input is compared with the first word set and a term is identified from a particular language of the plurality of languages based on the comparing of the textual input with the first word set. A second word set including terms from the particular language is retrieved from a network responsive to the identifying of the term, the number of terms from the particular language in the second word set being greater than the number of terms from the particular language in the first word set. The textual input is compared with the second word set. Auto-correction is applied to the textual input in the particular language based on the comparing with the second word set, and corrected text of the textual input is displayed via the user interface. Auto-correction as described can for example include correcting a misspelled word in the textual input, displaying user-selectable words for replacing the misspelled word in the textual input, completing a partially inputted word in the textual input, or displaying user-selectable words for completing the partially inputted word in the textual input.

BRIEF DESCRIPTION OF THE DRAWING(S)

A more detailed understanding may be had from the following detailed description of illustrative embodiments, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 2A-2I show user devices with exemplary screen displays pursuant to described electronic messaging methods.

FIGS. 3-7 are flowcharts showing particular electronic messaging methods according to the illustrative embodiments.

DETAILED DESCRIPTION OF ILLUSTRATIVE EMBODIMENT(S)

Figure 1:
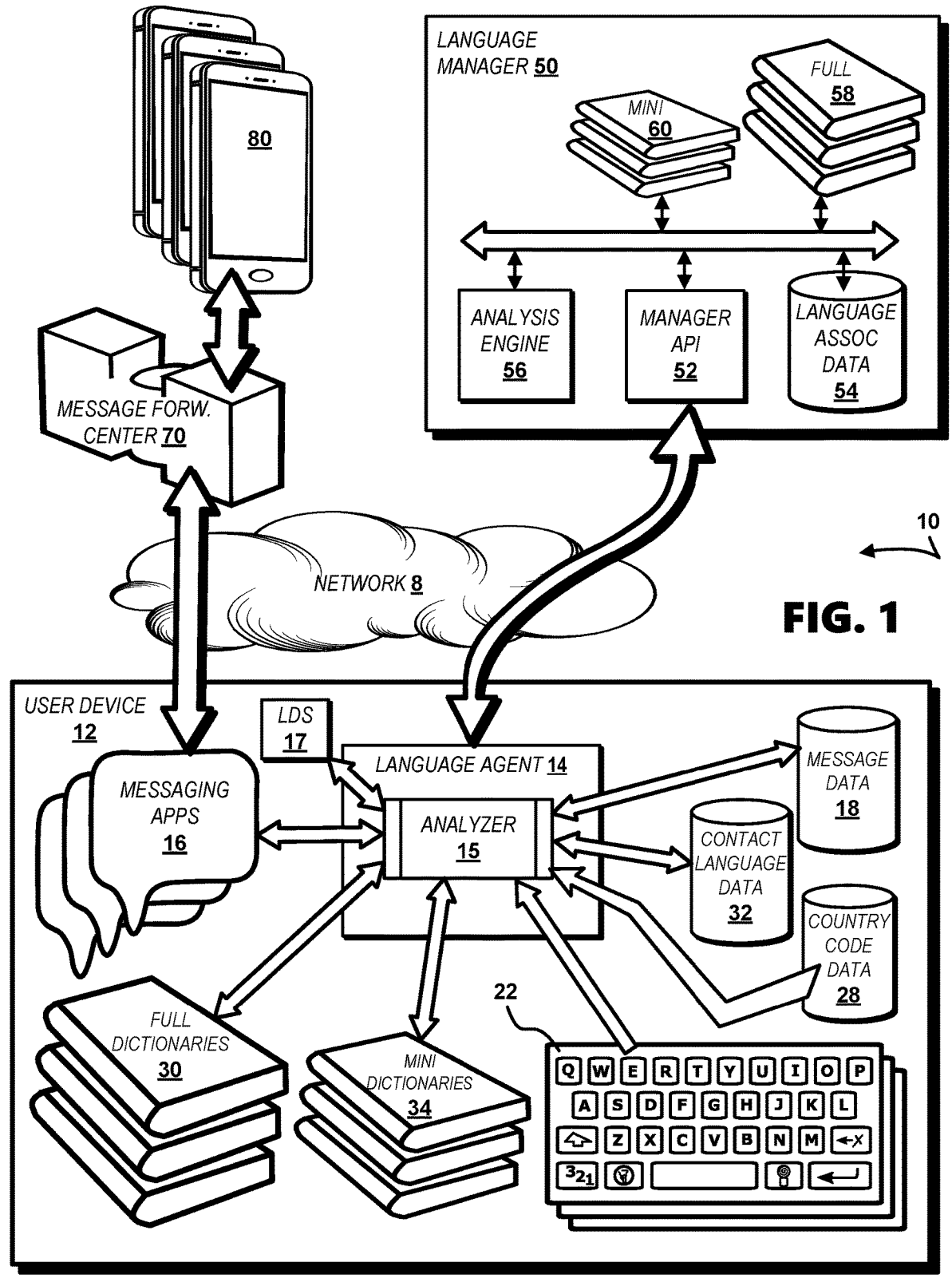
FIG. 1 shows a system including a user device and processor-enabled language manager enabling particular electronic messaging methods according to the illustrative embodiments.

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Referring to FIG. 1, a system 10 for facilitating device messaging processes is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks. A mobile communication device 12, for convenience of description termed the "user device 12", operates in the network 8. Software and/or hardware residing on the user device 12 enables a language agent 14 to monitor messaging processes on the user device 12 including Short Message Service ("SMS") protocol messages, email protocol messages, and messages enabled by other messaging protocols (e.g., WhatsApp™). The user device 12 can include for example a smart phone or other cellular enabled mobile device configured to operate on a wireless telecommunications network. Alternatively, the user device 12 can include a personal computer, tablet device, or other computing device configured for communication with a message gateway (e.g., an SMS gateway) to enable transmission and receipt of messages.

The user device 12 transmits and receives electronic messages using one or more messaging applications 16 configured to transmit and receive Short Message Service ("SMS") messages or messages implementing other messaging protocol, for example via 3G/4G/5G cellular protocols or WiFi™ protocol and/or TCP/IP through the Internet. A message forwarding center 70, for example a Short Message Service Center ("SMSC") is configured to forward messages between the user device 12 and other communication devices 80, such as cellular phones or other computing devices or systems, which can connect to the message forwarding center 70, for example via GSM wireless protocol or TCP/IP through the Internet.

The language agent 14 can be configured as a standalone application executable by a processor of the user device 12 in communication with the messaging application 16. Alternatively, the language agent 14 can be provided as a processor-implemented add-on application integral with the messaging application 16. Moreover, the language agent 14 can alternatively enable a standalone messaging client, for example using SMS or WhatsApp™ messaging protocol. Received and transmitted messages are stored on the user device 12 in a message datastore 18 accessible to the language agent 14.

The language agent 14, via an analyzer 15 enabled by a processor of the user device 12, makes determinations as to the language or languages being used or expected to be used by a user of the messaging application 16. The language agent 14 initiates in a user interface 20 of the user device 12 a data interface such as keyboards 22 including appropriate language characters or elements of one or more languages. The language agent 14 further enables auto-correction and auto-translate in a determined language or languages based on one or more language dictionaries 30, 34. Auto-correction as described herein includes automatically correcting misspelled words inputted by a user, or the proposing of user-selectable alternate words in response to incorrectly spelled words, as shown for example in FIG. 2F. Auto-correction as described herein also includes automatically completing incomplete words only partially inputted by a user, or the proposing of user-selectable complete words in response to incomplete words only partially inputted by a user (i.e., "auto-complete"). In the case that a particular computer operating system or a particular messaging application 16 does not allow access to keyboard functionalities, the language agent 14 enables keyboards 22 as virtual keyboards in communication with the messaging application 16 and including appropriate language characters or elements. The language agent 14 can further enable audio language input via a microphone of the user device 12 which input can be converted to text and auto-translated based on the one or more dictionaries 30, 34. Alternatively, the language agent 14 can enable other input devices for inputting characters or words into a message.

An international pre-dial ("country code") datastore 28 is accessible by the language agent 14 which is used in the determination of language. The international pre-dial datastore includes a listing of countries and predominant languages used in those countries, for example as shown in the abridged pre-dial listing set forth in Table 1 below. In response to detecting a new country code corresponding to a particular incoming or outgoing message, the language agent 14 accesses a message datastore 18 to determine if any prior messages by the user included one or more words from the particular predominant language corresponding to the country code. If so, the language agent 14 enables a particular keyboard 22 with characters corresponding to the particular predominant language and enables a language dictionary 30 including terms from the predominant language used for auto-correction and auto-translate. Beneficially for example, an Italian keyboard 22 would not be initiated in a user interface 20 of the user device 12 responsive to a user indicating a message recipient at the 0039 country code if the user has typed messages previously only in the English, German, and French languages. The Italian keyboard 22 would be initiated by the language agent 14 for the message to the recipient at the 0039 country code if the message datastore 18 included messages in which the user entered one or more Italian terms or Italian terms are detected in the current message. Alternatively, the determination of a predominant language can be made based on the country or region in which the user device 12 is located, for example as determined by signals received by a location determining system 17 such as a Global Positioning System ("GPS") or as determined based on received cellular tower data. Alternatively, the language agent 14 can be configured to enable a particular keyboard 22 and language dictionary 30 including terms of a particular language responsive only to detecting a country code or geographic location data corresponding to a particular predominant language in an incoming or outgoing message.

TABLE 1

| International Pre-Dial | Country | Predominant Language |
|---|---|---|
| 001 | USA | English |
| 0049 | Germany | German |
| 0039 | Italy | Italian |
| 0033 | France | French |

A contact language datastore 32 includes a designation of preferred languages between particular contacts, for example as shown in the abridged language listing set forth in Table 2 below. The language agent 14 via the analyzer 15 determines based on evaluation of messages in the message datastore 18 or real-time analysis of drafted messages, the preferred languages for communication between the user of the user device 12 and particular parties. The language agent 14 populates the contact language datastore 32 with preferred language information which can include one or more preferred languages transmitted by the user to a particular party and the one or more preferred languages received by the user from the particular party. Data in the contact language datastore 32 beneficially takes precedence over data in the country code datastore 28 for making a determination of the language settings (e.g., keyboard type, auto-correct language, auto-translate language) used for messaging with a particular contact. The contact language datastore 32 is updated based on communications occurring within one or more messaging application 16 (e.g., SMS, email, WhatsApp™) supported by the language agent 14.

TABLE 2

| Contact | Language(s) |
|---|---|
| +49 176 123 456 78 | German |
| +49 176 555 555 55 | English |
| +1 254 678 234 567 | Spanish |
| max@musterman.com | English |

The contact language datastore 32, with the permission of the user of the user device 12 is used to populate a network language association datastore 54 including contacts details and the used languages of contacts of a plurality of users of a plurality of devices 12 executing the language agent 14 thereon. The language association datastore 54 is rendered accessible by a language manager 50 functioning in the communications network 8. The language manager 50 and its constituent elements are preferably implemented on one or more network connectable processor-enabled computing systems via hardware components, software components sharing one or more processing units, or a combination hardware and software components. The language manager 50 need not be implemented on a single system at a single location, but can be decentralized such as in a peer-to-peer configuration, for example operating on two or more personal computers or mobile communication devices.

Figure 2A:
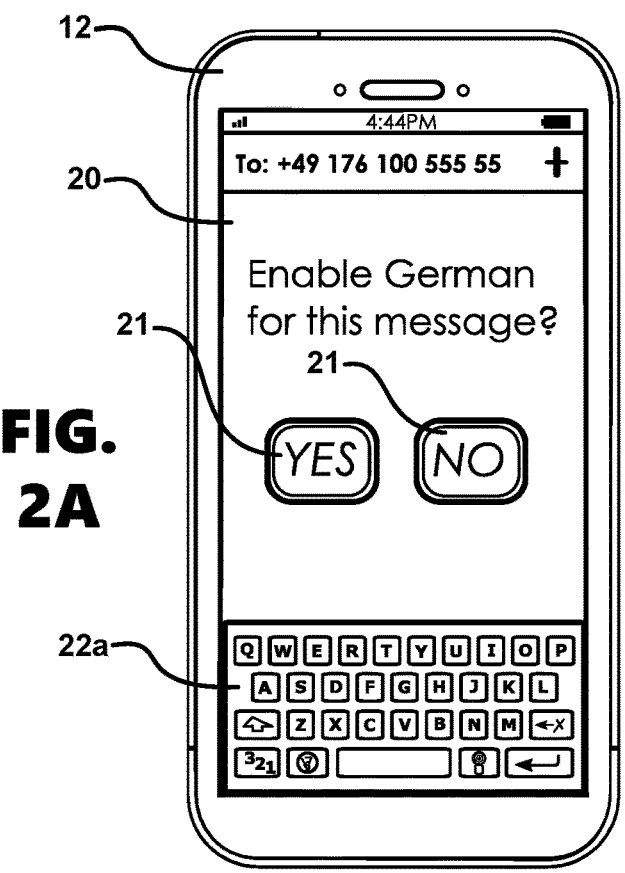
Figure 2B:
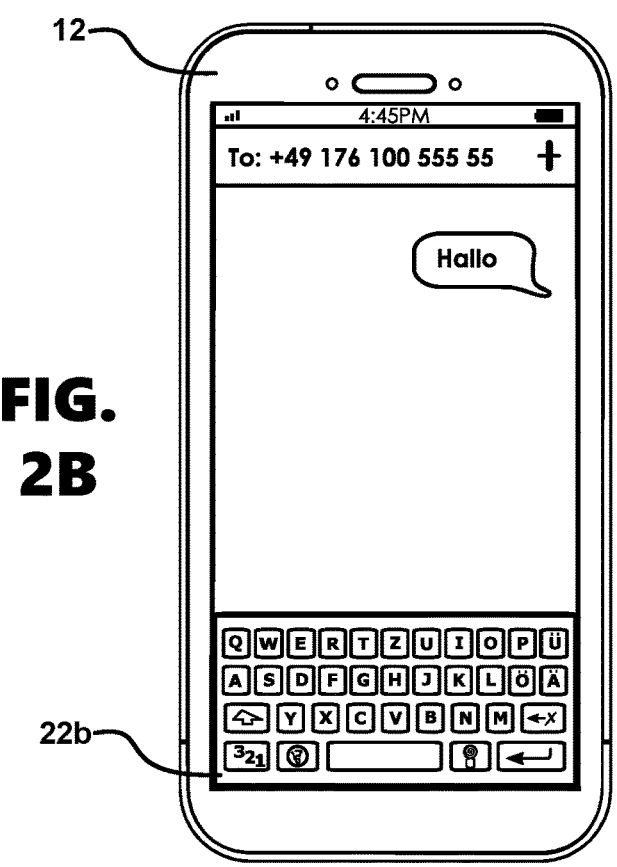

If a user initiates a communication with a particular contact not included in the contact language datastore 32, the language agent 14 queries the language association datastore 54 via a manager API 52 to determine if that contact is associated with a particular language based on prior communications with other users of the language agent 14 on other user devices 12. Information from the language association datastore 54 can be used alone or in association with information in the message datastore 18 and/or country code datastore 28 to determine language settings (e.g., keyboard type, auto-correct language, and auto-translate language) for communicating with that contact. The language agent 14 beneficially queries the user via the user interface 20 of the user device 12 before switching the language settings based on information in the language association datastore 54, contact language datastore 32, message datastore 18 and/or country code datastore 28. Referring to FIG. 2A for example, a user device 12 is provided with a user interface 20 (i.e. touch screen) showing an English keyboard 22a and an example query: "Enable German for this message?" Selectable buttons 21 displayed on the user interface 20 allow a user to select "Yes" or "No", wherein referring to FIGS. 1 and 2B, a German keyboard 22b and full dictionary 30 is enabled if the user selects "Yes".

The language agent 14 via the analyzer 15 is configured to determine if a new message is an answer to an existing message, and the language agent 14 adjusts the language setting based on the language of a message or messages to which the user is responding. For example, if a particular language is detected based on the language dictionaries 30 in a particular SMS thread involving the user and one or more other participants, the language agent 14 enables language settings (e.g., keyboard type, auto-correct language, auto-translate language) for the particular language used in the thread. If the particular language is different from a language determined based on the contact language datastore 32, language association datastore 54, message datastore 18 and/or country code datastore 28, the language agent 14 beneficially queries the user via the user interface 20 of the user device 12, for example in the manner shown in FIG. 2A, before switching the language settings.

The language agent 14 enables and has access to a plurality of minimalistic dictionaries 34, which are used in determining the language of a message content. Each of the minimalistic dictionaries 34 includes an abridged number of language terms (words) of one or more languages, beneficially including common terms likely to be used during a messaging interaction. For example, a particular minimalistic dictionary 34 of English can include 100 words such as "I", "you", "they", "thank", "best", "regards", "hello", "how", "are", "am", "nice". The minimalistic dictionaries 34 are beneficially built on machine learning platforms and stored locally on the user device 12 to allow for easy access by the language agent 14.

The minimalistic dictionaries 34 further include one or both of definitions or translations for the included terms. The language agent 14 as executed on a plurality of user devices 12 comprises a module which scans user message histories and current messages (e.g., SMS, email, and WhatsApp™ messages) to determine commonly used terms in languages used by the device user and forwards this information to the language manager 50. The language manager 50 via an analysis engine 56 updates minimalistic dictionaries 60 and full dictionaries 58 based on message information received from a plurality of user devices 12 implementing the language agent 14, beneficially using machine learning algorithms. The language manager 50 periodically pushes updates of the minimalistic dictionaries to the language agents 14 on the plurality of user devices 12, the updates based on the messages scanned by the language agents 14 executed on a plurality of user devices 12.

The language agent 14 captures text input from a particular keyboard 22 enabled by the language agent 14 for use in generating messages in a plurality of messaging platforms (e.g., SMS, email, WhatsApp™). The keyboard 22 can further enable receiving of audible language via an audio input apparatus (e.g., a microphone) of the mobile device 12 and converting the audible language into textual input by the analyzer 15. Alternatively, the keyboard 22 is enabled by an operating system of the user device 12 or by other resident application, in which case the language agent 14 enables a filter for capturing text entered via the keyboard 22. Captured text is analyzed by the analyzer 15. The analyzer 15 compares typed words or text converted from audible language with one or more full dictionaries 30 of languages enabled by the language agent 14, for example enabled based on prior use of the corresponding one or more languages by the particular user of the user device 12. The full dictionaries 30 include a large portion, most, or all of the words used in a particular language. If a particular word or series of words is not included in the full dictionaries 30 currently enabled by the language agent 14, the analyzer 15 looks up the missing word or words in the minimalistic dictionaries 34 to determine if the word or words are from a language represented by the minimalistic dictionaries 34. If the analyzer 15 finds that the missing words are from a language represented by one of the minimalistic dictionaries 34, the language agent 14 initiates a download of a full dictionary 58 of that language from the language manager 50 which is installed as a full dictionary 30 on the user device. The newly installed full dictionary 30 can be used by the analyzer 15 for analyzing the current and future messages generated by the user of the user device 12.

Installed full dictionaries 30 are combinable by the language agent 14. This way a user can for example type English words when using a German language keyboard 22b, allowing convenient typing of umlauts ("¨") (e.g., in names), without triggering auto-correction, for example automatically correcting or completing English words as German words. In this manner, the user can have access to required language elements of a particular keyboard without being inconvenienced by having to switch keyboards when entering words in a different language. Combined dictionaries are beneficially made available by the language agent 14 for particular languages having a set of keyboard characters that include most or substantially all characters of one or more other languages, but not necessarily vice versa. Combined dictionaries enables correction in more than one language or converting terms from one language into their equivalents in another language. For example a combined English and German dictionary applied to an English SMS message by the language agent 14 can correct "Joerg" to "Jörg" and correct "Baerbel" to "Bärbel".

A person's passive knowledge of a non-native language may be greater than the user's active knowledge such that during communication in the non-native language one or more words in the non-native may be unknown to the person. The user of the user device 12 while generating a message in a particular language in the messaging application 16 is enabled to enter language elements in another language, wherein the analyzer 15 translates terms to the predominant particular language of the communication. This functionality is enabled since the language agent 14 maintains a record of languages used by the user of the user device 12, for example in the contact language datastore 32 and the message datastore 18. For purposes of illustration, a native German speaker entering an English message does not know a particular word and uses an equivalent German word instead. The analyzer 15 implementing full German and English dictionaries 30 is configured to translate the German word to English while the user is entering the message in the messaging application 16. For example referring to FIGS. 2C, 2D, and 2E, a German-speaking user types using the German keyboard 22b the mixed-language message "I'm sorry I can't visit today. I just had a Bandscheibenvorfall." The analyzer 15, based on full English and German dictionaries 30, determines that the predominant language in the communication is English and that "Bandscheibenvorfall" is a German word. Responsive thereto, the language agent 14 automatically corrects "Bandscheibenvorfall" to read "slipped disk" based on definitions in the English and German dictionaries 30. The language agent 14 further offers "herniated disk" and "slipped lumbar disk" as user-selectable alternate translation buttons 23 in the user interface 20. In FIG. 2E, the button 23 corresponding to "herniated disk" is shown as actuated by a user, and responsive thereto the language agent 14 modifies the translation from "slipped disk" to "herniated disk" in the user interface 20.

Figure 2F:
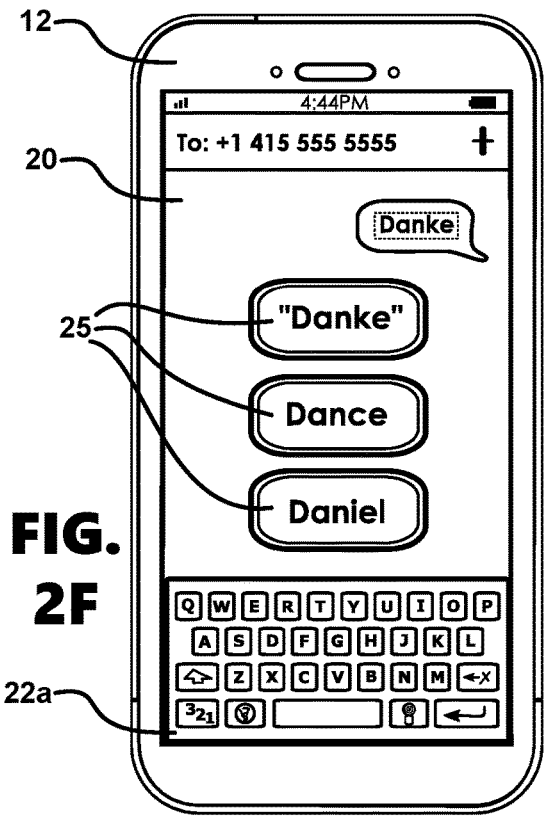
Figure 2G:
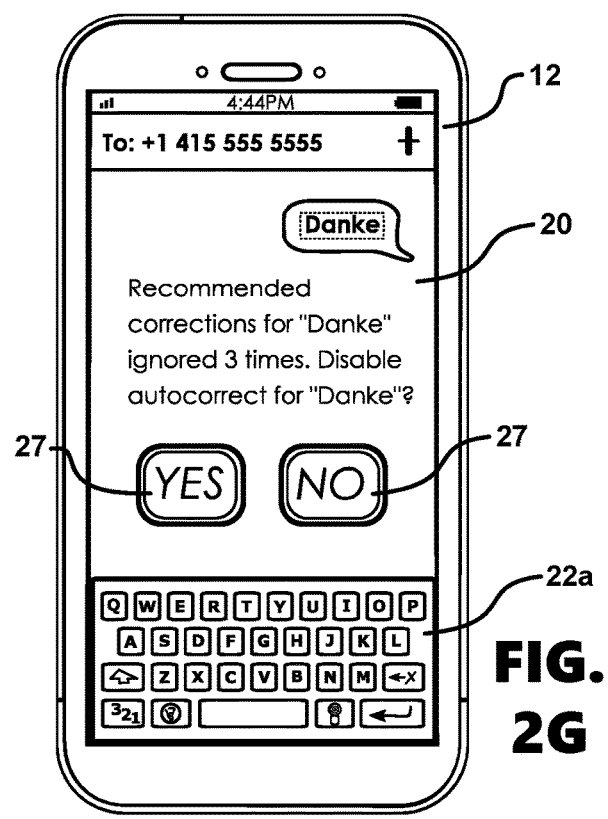
Figure 2H:
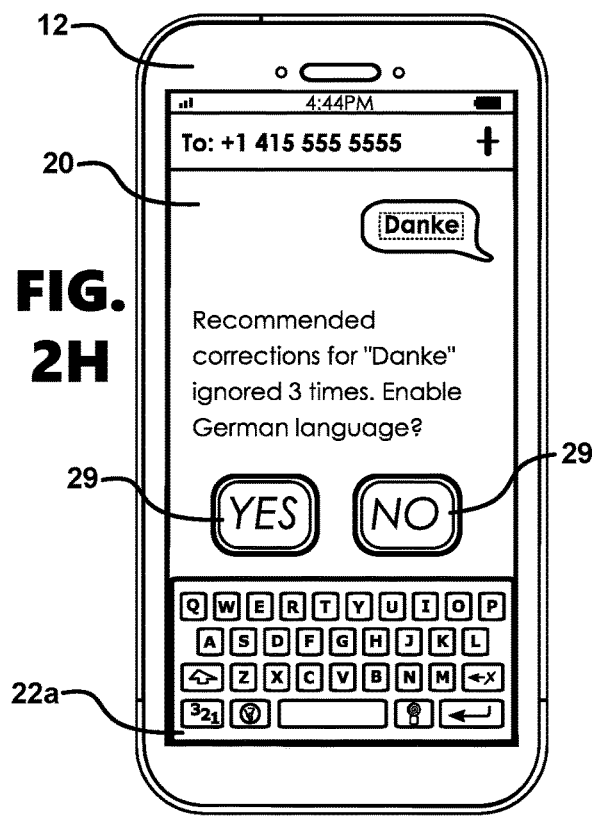
Figure 2I:
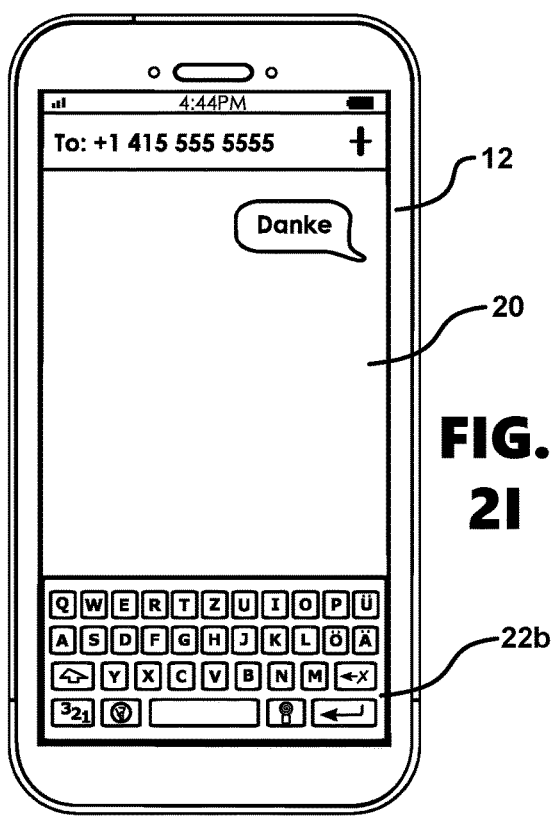

Referring to the user device 12 showing exemplary screen displays of FIGS. 2F-2I, the language agent 14 is further configured to disable auto-correction or enable full dictionary 30 and a keyboard 22 for a particular language based on a user's messaging history. FIG. 2F shows buttons 25 enabled by the analyzer 15 allowing a user to select exemplary corrections "Dance" and "Daniel" or the original inputted word "Danke" (the German word for "thank you"). Responsive to the user ignoring proposed corrections (e.g., selecting button 25 for "Danke") a particular number of times (e.g., 3 times), the language agent 14 enables buttons 27 and a query as shown in FIG. 2G: "Recommended corrections for 'Danke' ignored 3 times. Disable autocorrect for 'Danke'?" By selecting the "YES" button 27, subsequent textual inputs of the word "danke" are not flagged for auto-correction by the analyzer 15. Alternatively or responsive to a "NO" selection in FIG. 2G, the language agent 14 enables buttons 29 and a query as shown in FIG. 2H: "Recommended corrections for 'Danke' ignored 3 times. Enable German language?" Buttons 29 are enabled based on a determination by the analyzer 15 that the word "danke" is the German word for "thank you" (e.g., based minimalistic dictionaries 34). By user selection of the "YES" button 29, the language agent enables the German language keyboard 22b to replace the English language keyboard 22a, as shown in FIG. 2I, and the full German dictionary 30 is enabled in addition to the full English dictionary 30 for subsequent messages.

Referring to FIG. 3, a flowchart shows a method 200 performed by a user device via a processor. While the method 200 and associated processes are described with reference to the components shown in FIG. 1, including the user device 12 and the network-accessible processor-enabled language manager 50, the method 200 may alternatively be performed via other suitable systems.

The method 200 includes launching a textual communication application by a processor of the user device 12 comprising the user interface 20 (step 202). A data entry interface, for example the keyboard 22, is enabled by the processor of the user device 12 in the user interface 20 (step 204) the data entry interface including language elements in a particular language determined based on an international calling code of one or more stored textual communications involving a user of the user device or one or more languages of one or more stored textual communications involving a user of the user device. A textual input is received via the data entry interface (e.g., keyboard 22) comprising the language elements, for example characters, in the particular language (step 206). Alternatively, the user device 12 can determine its location based on received signals (e.g., via the LDS 17), and the data entry interface including language elements in the particular language can be enabled based on the determined location, for example based on the predominant language of a country in which the user device 12 is located.

Referring to FIG. 4, a flowchart shows a method 300 performed by a user device via a processor. The method 300 includes the steps of the method 200 and additional steps useful for implementing a particular illustrative embodiment. While the method 300 and associated processes are described with reference to the components shown in FIG. 1, including the user device 12 and network-accessible processor-enabled language manager 50, the method 300 may alternatively be performed via other suitable systems.

In a step 302, a processor of the user device 12 launches a textual communication application (e.g., messaging application 16). An indication of a particular message recipient at a particular phone number is received by the user device 12 in the textual communication application via the user interface 20 of the user device 12 (step 304). The particular phone number of the particular message recipient is compared with a listing of international calling codes (i.e. country codes) and predominant languages corresponding to respective countries corresponding to the listing of international calling codes (step 306), and a particular language is identified corresponding to an international calling code of the particular phone number (step 308). A message history of the user is compared with a word set comprising terms from at least the particular language (step 310), and one or more terms from the particular language are identified in a stored communication between the user and a party other than the particular message recipient (step 312). A data entry interface, for example the keyboard 22, is enabled in the user interface 20 responsive to the identifying the particular language corresponding to the international calling code and the identifying the one or more terms from the particular language in the stored communication, the data entry interface comprising the language elements in the particular language (step 314). Alternatively, the data entry interface can be enabled based only on the identifying the particular language corresponding to the international calling code. Alternatively, the user device 12 can determine its location based on received signals (e.g., via the LDS 17), and the data entry interface in the particular language can be enabled based on the determined location alone or in combination with the identifying the one or more terms from the particular language in the stored communication, for example based on the predominant language of a country in which the user device is located. Auto-correction is applied to the textual input in the particular language based on the word set (step 316), and corrected text of the textual input is displayed via the user interface 20 (step 318). Auto-correction as described can for example include one or more of correcting a misspelled word in the textual input, displaying in the user interface 20 user-selectable words for replacing the misspelled word in the textual input, completing a partially inputted word in the textual input, and displaying user-selectable words for completing the partially inputted word in the textual input.

Figure 5:
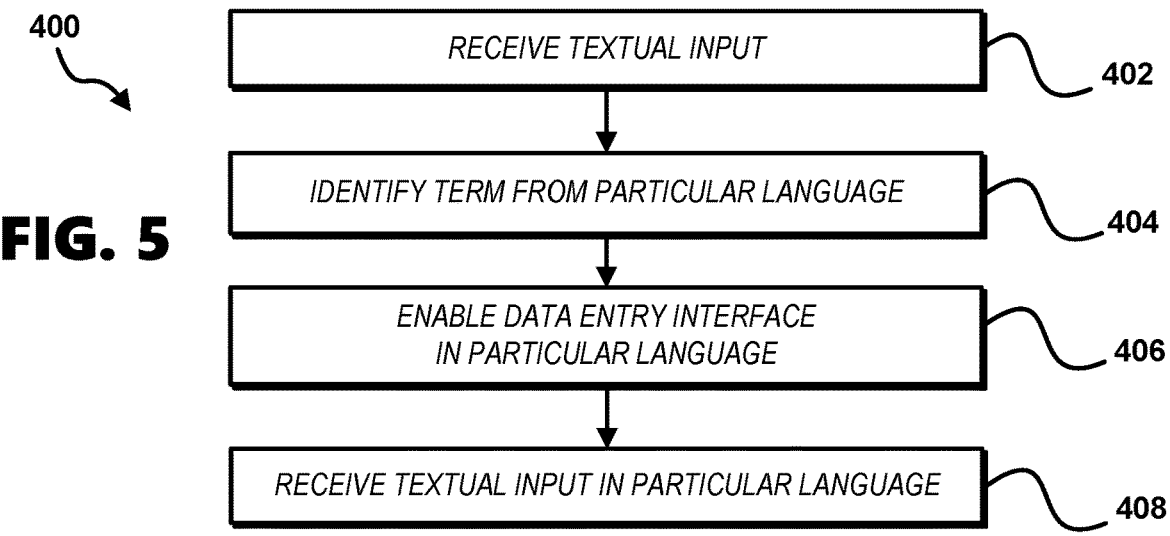

Referring to FIG. 5, a flowchart shows an electronic messaging method 400 performed by a user device via a processor. While the method 400 and associated processes are described with reference to the components shown in FIG. 1, including the user device 12 and network-accessible processor-enabled language manager 50, the method 200 may alternatively be performed via other suitable systems.

In the method 400, textual input is received by the user device 12 from a user via the user interface 20 of the user device 12 (step 402), and a term from a particular language is identified in the textual input (step 404). A data entry interface, for example an on-screen keyboard 22 enabled by a messaging application 16, is enabled in the user interface 20 comprising language elements, for example language characters, in the particular language (step 406). Beneficially, the data entry interface is enabled responsive to the identifying of the term of the particular language. The textual input is received via the data entry interface in the particular language (step 408).

The method 400 can also include receiving an indication of a particular message recipient, and comparing the particular phone number of the particular message recipient with a listing of international calling codes and predominant languages corresponding to respective countries corresponding to the listing of international calling codes. A first language can be identified corresponding to the international calling code of the particular phone number, for example by the analyzer 15. Alternatively, the first language can be identified as the predominant language of the country or region determined based on the location of the user device 12, as determined for example by the LDS 17. A message history of the user can be compared with a word set comprising terms from a plurality of languages for example word sets included in full dictionaries 30 or minimalistic dictionaries 34, and one or more terms can be identified from the first language in a stored communication between the user and a party other than the particular message recipient. The textual input can be compared with the word set to identify the term from the particular language which comprises a second language. Alternatively any transmitted textual communication between the user and the particular message recipient can be compared with the word set to identify the term from the particular language comprising the second language. The language agent 14 can enable a user query via the user interface in response to the identifying of the first language and the identifying of the second language, and receive a selection by the user of one or both of the first language and the second language via the user query. Further, the data entry interface can be enabled in the user interface comprising language elements in one or both of the first language and the second language responsive to the selection or selections by the user via the user query. For example a keyboard can be enabled with characters in the first language, the second language, or both the first and second languages. The method 400 can further include applying auto-correction to the textual input, for example by the analyzer 15 in one or both of the first language and the second language based on the word set, and displaying via the user interface corrected text of the textual input. Auto-correction can be disabled for a particular term after a user ignores a particular correction a particular number of times, for example as shown in FIGS. 2F and 2G. Auto-correction as described can for example include one or more of correcting a misspelled word in the textual input, displaying in the user interface 20 user-selectable words for replacing the misspelled word in the textual input, completing a partially inputted word in the textual input, and displaying user-selectable words for completing the partially inputted word in the textual input.

The method 400 can also include identifying the term from the particular language a particular number of times, wherein a user query can be enabled (e.g., including buttons 29 shown in FIG. 2H) via the user interface 20 in response to identifying the term from the particular language the particular number of times. A user can select the particular language via the user query, and the data entry interface (e.g., a keyboard 22b as shown in FIG. 2I) can be enabled in the user interface 20 comprising language elements in the particular language responsive to the selection by the user via the user query. A full dictionary 30 including a word set from the particular language can also be retrieved and enabled for subsequent messages responsive to the user's selection via the user query. Textual input can be compared with the word set and auto-correction can be applied to the textual input in the particular language based on the comparing with the word set.

Figure 6:
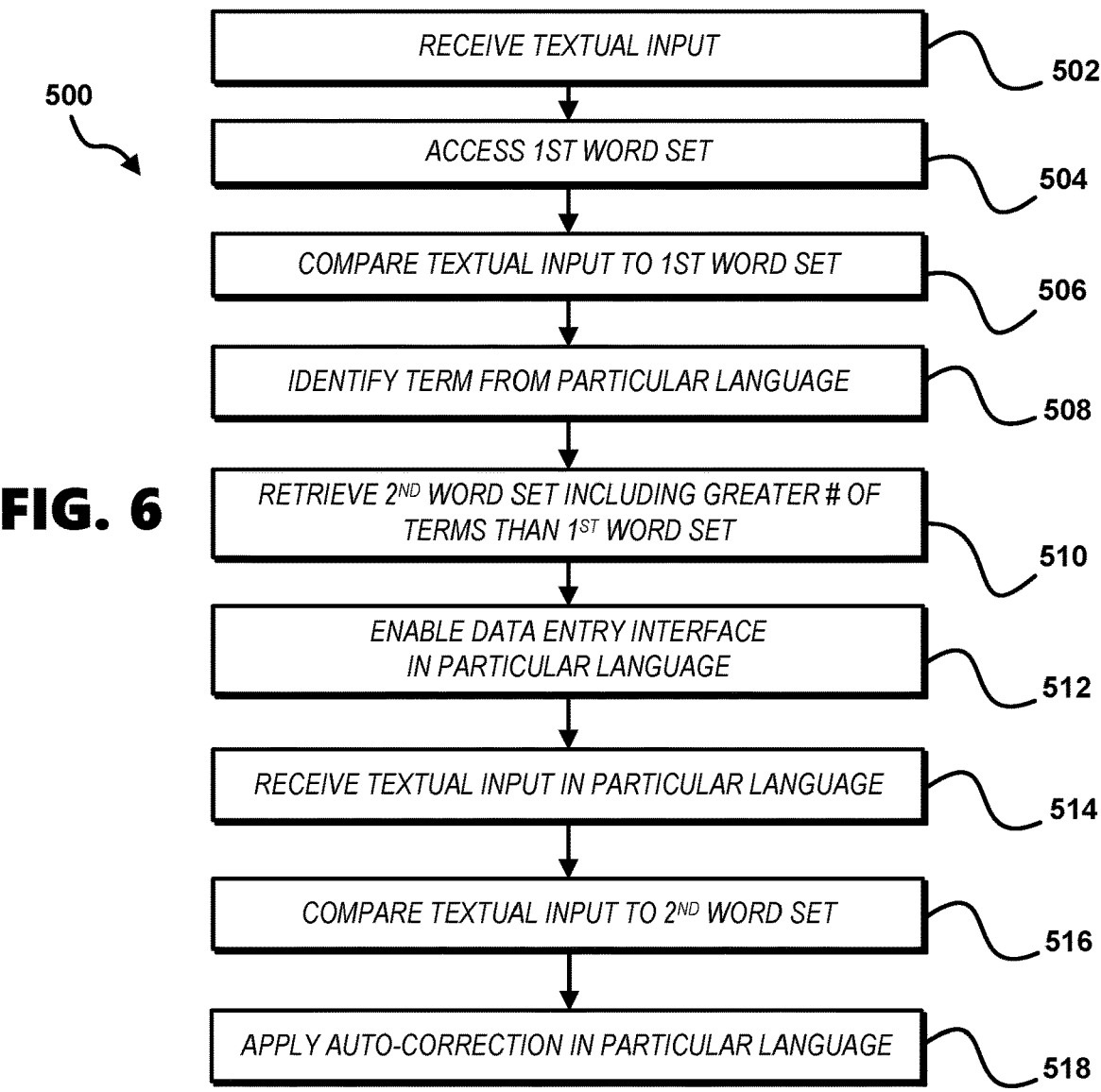

Referring to FIG. 6, a flowchart shows a method 500 performed by a user device via a processor. The method 500 includes the steps of the method 400 and additional steps useful for implementing a particular illustrative embodiment. The method 500 and associated processes are described with reference to the components shown in FIG. 1, including the user device 12, communication network 8 and network-accessible processor-enabled language manager 50, the method 500 may alternatively be performed via other suitable systems.

In a step 502, textual input is received by the user device 12 from a user via a user interface 20 of the user device 12. The user device 12 accesses a first word set comprising terms from a plurality of languages (step 504). The first word set can include for example a plurality of minimalistic dictionaries 34 including select words from a number of languages. The textual input is compared with the first word set (step 506), and a term from a particular language is identified in the textual input (step 508). The language agent 14 implementing the analyzer 15 via a processor of the user device 12, can perform the comparing and identifying steps. A second word set is retrieved comprising terms from the particular language responsive to the identifying of the term, the number of terms from the particular language in the second word set being greater than the number of terms from the particular language in the first word set (step 510). The second word set can include for example one or more full dictionaries 30 including a large portion, most, or all of the words used in the particular language. Beneficially, the second word set is retrieved via the communications network 8 from a network-accessible processor-enabled system, for example the language manager 50. A data entry interface, for example an on-screen keyboard 22 enabled by a messaging application 16, is enabled in the user interface 20 comprising language elements in the particular language (step 512), and the textual input is received via the data entry interface, for example including language characters corresponding to keys of the keyboard 22, in the particular language (step 514). The textual input is compared with the second word set (step 516), and auto-correction is applied to the textual input in the particular language based on the comparison of the textual input with the second word set (step 518). Auto-correction as described can for example include one or more of correcting a misspelled word in the textual input, displaying in the user interface 20 user-selectable words for replacing the misspelled word in the textual input, completing a partially inputted word in the textual input, and displaying user-selectable words for completing the partially inputted word in the textual input.

The method 500 can further include receiving textual input in multiple languages. The textual input can be received in a first language at a first time on a first keyboard 22, and the textual input can be received in the particular language comprising a second language at a second time via a second keyboard 22 or other data entry interface enabled in response to the analyzer 15 identifying the term from the particular language.

Figure 7:
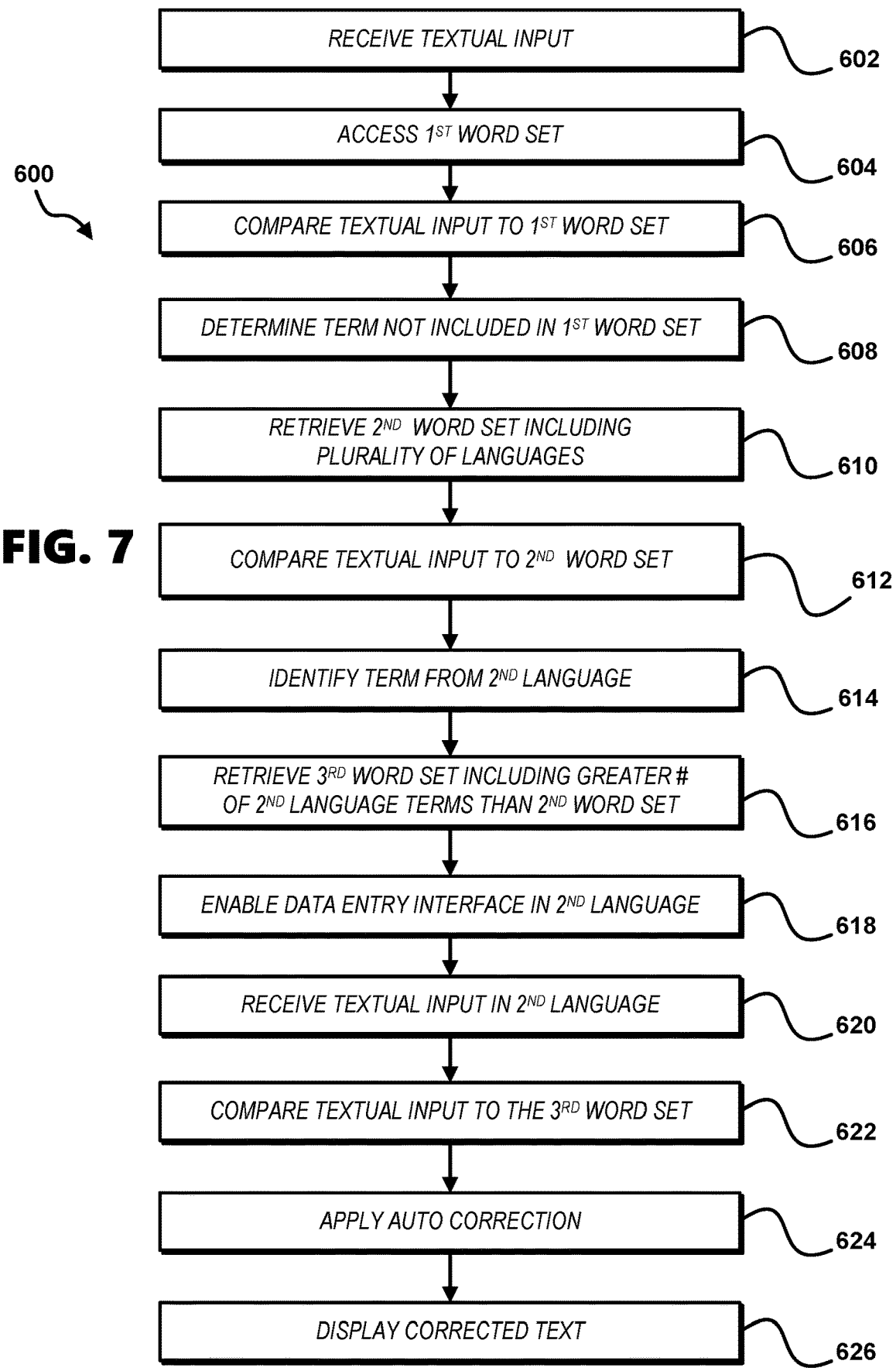

Referring to FIG. 7, a flowchart shows a method 600 performed by the user device via a processor. The method 600 includes the steps of the method 400 and additional steps useful for implementing a particular illustrative embodiment. While the method 600 and associated processes are described with reference to the components shown in FIG. 1, including the user device 12, communications network 8, and network-accessible processor-enabled language manager 50, the method 500 may alternatively be performed via other suitable systems.

In a step 602, textual input is received by the user device 12 from a user via the user interface 20 of the user device 12. Additionally, the user device 12 can receive an indication of a particular message recipient at a particular electronic address or phone number. The user device 12 accesses a first word set comprising terms from a first language (step 604). The first word set can include for example one or more full dictionaries 30 including a large portion, most, or all of the words used in the first language. The textual input is compared with the first word set (step 606), and one or more terms are determined to be not included in the first word set (step 608). The language agent 14 implementing the analyzer 15 via a processor can for example perform the comparing and identifying steps. A second word set is retrieved including terms from a plurality of languages (step 610). The second word set can include for example a plurality of minimalistic dictionaries 34 including select words from a number of languages. The textual input is compared with the second word set (step 612), and a term from a second language is identified based on the comparing of the textual input with the second word set (step 614). A third word set is retrieved including terms from the second language responsive to the identifying of the term from the second language, the number of terms in the second language in the third word set being greater than the number of terms in the second language in the second word set by at least a factor of two (step 616). The third word set can include for example one or more full dictionaries 30 including a large portion, most, or all of the words used in the second language. Beneficially, the third word set is retrieved via a communications network 8 from a network-accessible processor-enabled system, for example the language manager 50.

A data entry interface including language elements in the second language, for example an on-screen keyboard 22 enabled by a messaging application 16, is enabled in the user interface 20 (step 618). The textual input is received via the data entry interface in the second language (step 620), for example as language characters corresponding to keys of the keyboard 22. The data entry interface can alternatively include one or more keyboards 22 including characters of both the first language and the second language. The textual input is compared with the third word set (step 622), and auto-correction is applied to the textual input in the second language based on the comparison of the textual input with the third word set (step 624). Auto-correction can additionally be applied to the textual input in the first language based on the comparison of the textual input with the first word set such that a single message can include multiple languages. Corrected text of the textual input is displayed via the user interface 20 of the user device 12 (step 626). Alternatively, the corrected text can include translated text, for example by translating textual input from the first language to the second language based on which of the first or second language is a predominant language in the textual input or in one or more transmitted communications between the user of the user device 12 and a particular message recipient to whom the textual input is directed.

In the method 600, predominant language can be determined by the analyzer 15 based on a comparison of the textual input or other communication with one or more of the first word set, second word set, and third word set, for example by determining a number of terms in each language and designating a particular language as dominant when the number of terms in that language are greater or significantly greater than one or more other languages in a communication. Further, auto-translation can be performed by the analyzer 15 based on one or more of the first word set, second word set, and third word set, the word sets including for example the full dictionaries 30 of the first language and the second language. For example, the third word set can include translations from the second language to the first language, and applying auto-translate can include applying the translations from the third word set to the textual input. Alternatively, one or more additional dictionaries special purposed for translating a particular language can be retrieved from the language manager via the network 8 and used for the translation. Translations are beneficially performed on the user device 12 via the analyzer 15 enabled by a processor using the full dictionaries 30. Alternatively, translations can be performed by one or more processors of the language manager 50 based on language dictionaries and such translations can be returned to the user device 12 via the network 8, although such configuration may suffer from latency issues depending on the speed and robustness of the network 8.

Full dictionaries 30 can be large and include complex and processor intensive algorithms (e.g., machine learning algorithms) for implementing recognition, correction, and translation of text in particular languages. Methods described herein are effective in conserving device resources including data storage, memory, power consumption, and processing usage by applying only the full dictionaries 30 determined to be required based on prior use and other data as described above and otherwise applying minimalistic dictionaries 34. User experience is improved through implementation of relevant full dictionaries 30 without substantial increases in latency and device battery use of a user device 12 implementing the language agent 14.

Full and minimalistic dictionaries 30, 34 and corresponding machine learning algorithms can be updated, for example locally on a user device 12, based on user textual input, received communications, and user selection of recommended corrections or translations, for example as shown in FIGS. 2D and 2E and described herein. Network-accessible dictionaries 58, 60 can be updated based on the user textual input, received communications, and user selection of recommended corrections or translations of a plurality of users executing a language agent 14 on a plurality of user devices 12. Each full and minimalistic dictionary 30, 34, for example stored locally on the device 12, are also beneficially customized by machine learning based on a user's particular style of language input, received communications, and user selection of recommended corrections or translations. Further, updates can be made to a customized dictionaries of a particular user based on updates made to network-accessible dictionaries 58, 60.

Figure 8:
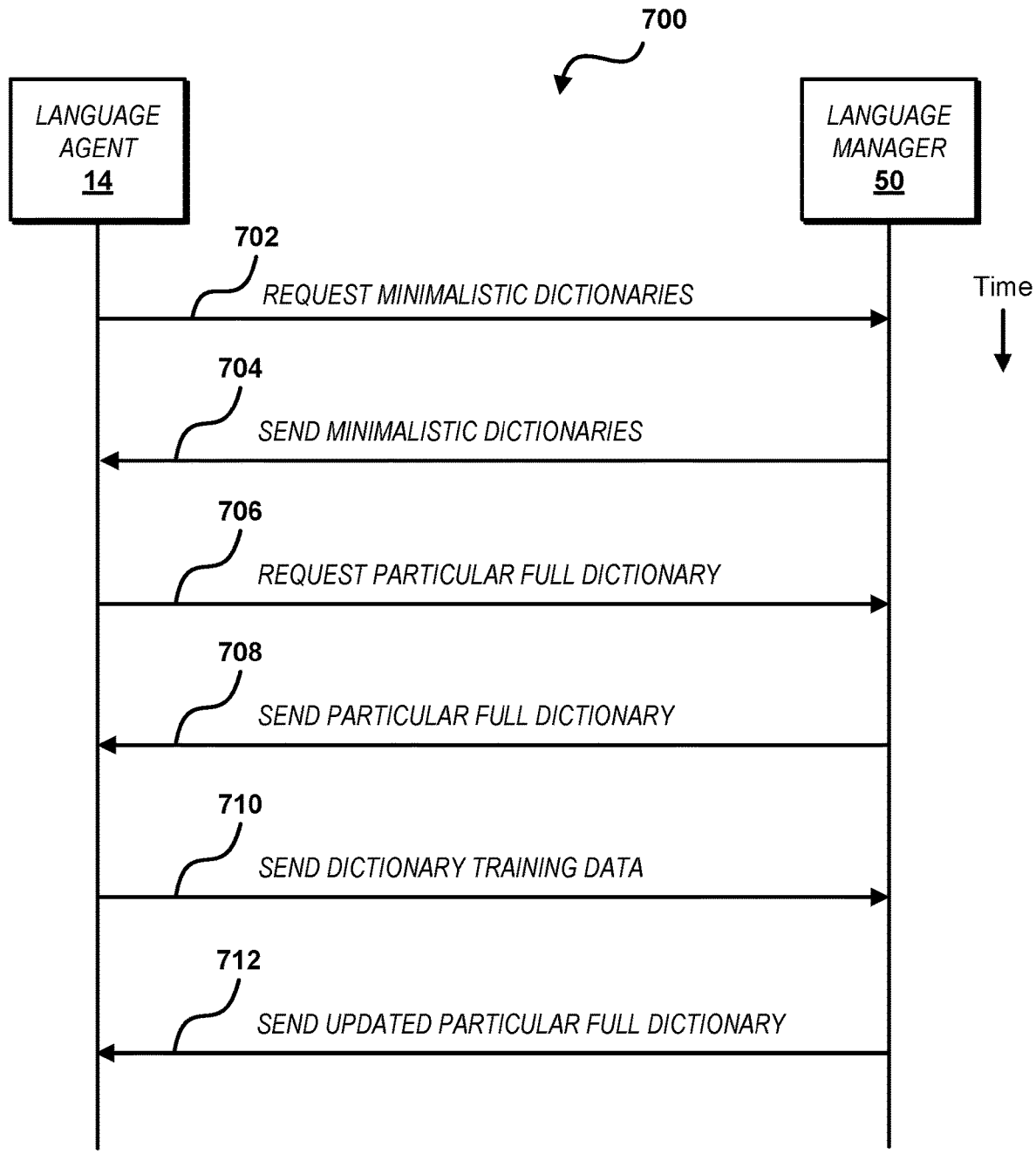
FIG. 8 is an illustrative communication flow between the user device and the processor-enabled language manager.

Referring to FIG. 8, an illustrative communication flow 700 between a language agent 14 executed on the user device 12 and the network-accessible processor-enabled language manager 50 is shown. Communications described in the communication flow 700 can be synchronous or asynchronous. In a communication 702, the language agent 14 transmits a request for a set of minimalistic dictionaries. The request can be transmitted by the language agent 14 for example responsive to a determination by the analyzer 15 of an unknown term or terms in a text communication. Alternatively, the request (communication 702) can be transmitted by the language agent 14 for example responsive to user device startup, responsive to initiation of the language agent 14, responsive to other event, or at predetermined scheduled time intervals. In a communication 704, the language manager 50 transmits a set of minimalistic dictionaries 60 responsive to the request (communication 702), which are saved as minimalistic dictionaries 34 or used in updating existing minimalistic dictionaries 34 stored on the user device 12 by the language agent 14. The minimalistic dictionaries 34 include terms, and beneficially also definitions, from a plurality of languages. In a communication 706, the language agent 14 transmits a request for a full dictionary in a particular language, for example responsive to identifying one or more terms in the particular language in a message by comparing the message with the minimalistic dictionaries 34. In a communication 708, responsive to the request (communication 706) the language manager 50 transmits a particular full dictionary 58 for the particular language which is saved on the user device 12 as a particular full dictionary 30 for the particular language or used in updating an existing particular full dictionary 30 for the particular language stored on the user device 12 by the language agent 14. The particular full dictionary 30 includes terms, and beneficially also definitions, in the particular language. The number of terms in the particular language in the particular full dictionary 30 are significantly greater than the number of terms in the particular language in the minimalistic dictionaries 34.

The analyzer 15 of the language agent 14 compares the particular full dictionary 30 to user message data and performs translation and corrections of message textual input by implementing the particular full dictionary 30. Based on the comparing, and user selection, and acceptance of proposed corrections and translations, in a communication 710 the language agent 14 transmits training data to the language manager 50. The language manager 50 determines an updated particular full dictionary 58 for the particular language responsive to receiving the training data from the language agent 14 of one or more user devices 12. In a communication 712, the language manager 50 transmits the updated particular full dictionary 58 to the language agent 14 executed on one or more user devices 12 which currently maintain in storage the particular full dictionary 30 corresponding to the particular language. The updated particular full dictionary 58 is saved as the particular full dictionary 30 for the particular language or used in updating the existing particular full dictionary 30 for the particular language stored on the user device 12 by the language agent 14.

Figure 9:
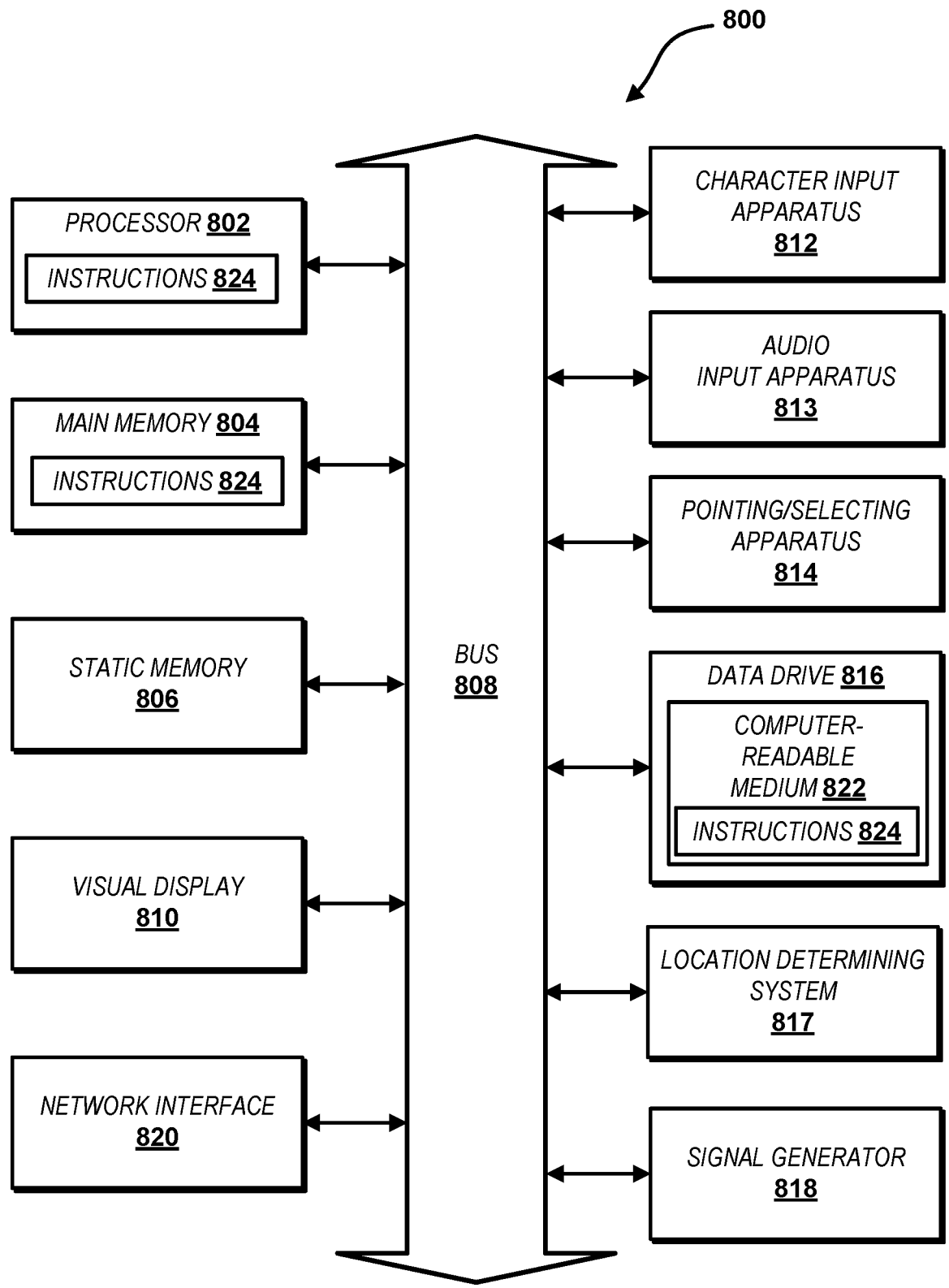
FIG. 9 is an illustrative computer system for performing described electronic messaging methods according to the illustrative embodiments.

FIG. 9 illustrates in abstract the function of an exemplary computer system 800 on which the systems, methods and processes described herein can execute. For example, the user device 12, language manager 50, and message forwarding center 70 can each be embodied by a particular computer system 800. The computer system 800 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 824 executable by the computer system 800.

The computer system 800 can operate as a standalone device or can be connected (e.g., networked) to other machines. In a networked deployment, the computer system 800 may operate in the capacity of a server or a client machine in server-client network environment, or as a peer machine in a peer-to-peer (or distributed) network environment. The computer system 800 can also be considered to include a collection of machines that individually or jointly execute a set (or multiple sets) of instructions to perform one or more of the methodologies described herein.

It would be understood by those skilled in the art that other computer systems including but not limited to network personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 800 includes a processor 802, for example a central processing unit (CPU) or a graphics processing unit (GPU), a main memory 804, and a static memory 806 in communication via a bus 808. A visual display 810 for example a liquid crystal display (LCD), light emitting diode (LED) display or a cathode ray tube (CRT) is provided for displaying data to a user of the system. The visual display 810 can be enabled to receive data input from a user for example via a resistive or capacitive touch screen. A character input apparatus 812 can be provided for example in the form of a physical keyboard, or alternatively, a program module which enables a user interactive simulated keyboard (e.g., keyboard 22) on the visual display 810 and actuatable for example using a resistive or capacitive touchscreen. An audio input apparatus 813 for example a microphone enables audible language input which can be converted to textual input by the processor 802 via the instructions 824. A pointing/selecting apparatus 814 can be provided, for example in the form of a computer mouse or enabled via a resistive or capacitive touch screen in the visual display 810. A data drive 816, a signal generator 818 such as an audio speaker, and a network interface 820 can also be provided. A location determining system 817 is also provided which can include for example a GPS receiver and supporting hardware.

The instructions 824 and data structures embodying or used by the herein-described systems, methods, and processes, for example software instructions, are stored on computer-readable medium 822 and are accessible via the data drive 816. Further, the instructions 824 can completely or partially reside for a particular time period in the main memory 804 or within the processor 802 when the instructions 824 are executed. The main memory 804 and the processor 802 are also as such considered computer-readable media.

While the computer-readable medium 822 is shown as a single medium, the computer-readable medium 822 can be considered to include a single medium or multiple media, for example in a centralized or distributed database, or associated caches and servers, that store the instructions 824. The computer-readable medium 822 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, and CD-ROM and DVD-ROM disks, Erasable Programmable Read-Only Memory (EPROM), Electrically Erasable Programmable Read-Only Memory (EEPROM), and flash memory devices).

The instructions 824 can be transmitted or received over a communications network, for example the communications network 8, using a signal transmission medium via the network interface 820 operating under one or more known transfer protocols for example, FTP, HTTP, or HTTPs. Examples of communication networks include a local area network (LAN), a wide area network (WAN), the Internet, mobile telephone networks, Plain Old Telephone (POTS) networks, and wireless data networks for example, WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims. The Abstract is provided to allow the reader to quickly ascertain the nature and gist of the technical disclosure. The Abstract is not intended to be used to limit the scope of the claims.

What is claimed is:

1. An electronic messaging method implemented by one or more processors, the method comprising:
    launching a textual communication application by a user device comprising a user interface;
    enabling in the user interface a data entry interface comprising displayed actuatable language character elements in a particular language determined based on at least one of:
        an international calling code of at least one stored textual communication involving a user of the user device; or
        at least one language of the at least one stored textual communication involving the user of the user device, the stored textual communication comprising at least one of text transmitted by the user of the user device or text received by the user of the user device from a particular party; and
    receiving a textual input via the data entry interface comprising the displayed actuatable language character elements in the particular language;
    accessing by the user device a first word set comprising terms from a plurality of languages comprising the particular language;
    comparing the textual input with the first word set to identify a particular term from the particular language;
    retrieving from a plurality of word sets a second word set comprising a number of terms from the particular language greater than the number of terms from the particular language in the first word set responsive to the identifying of the particular term from the particular language in the textual input;
    comparing the textual input with the second word set; and
    applying auto-correction to the textual input in the particular language based on the comparing with the second word set.

2. The method of claim 1, further comprising:
    receiving, by the user device in the textual communication application via the user interface of the user device an indication of a particular message recipient at a particular phone number;

comparing the particular phone number of the particular message recipient with a listing of international calling codes and predominant languages corresponding to respective countries corresponding to the listing of international calling codes, and identifying the particular language as corresponding to an international calling code of the particular phone number;

comparing a message history of the user with the first word set, and identifying at least one term from the particular language in a stored communication between the user and a party other than the particular message recipient; and enabling the data entry interface in the user interface comprising the displayed actuatable language character elements in the particular language responsive to the identifying the particular language corresponding to the international calling code of the particular phone number and the identifying the at least one term from the particular language in the stored communication.

3. The method of claim 2, further comprising displaying via the user interface corrected text of the textual input.

4. An electronic messaging method implemented by one or more processors, the method comprising:
receiving first textual input by a user device from a user via a user interface of the user device;
accessing by the user device a first word set comprising terms from a plurality of languages, the plurality of languages comprising a particular language;
comparing the first textual input with the first word set to identify a term from the particular language in the first textual input;
enabling a data entry interface in the user interface comprising displayed actuatable language character elements in the particular language responsive to the identifying of the term from the particular language in the first textual input;
retrieving a second word set comprising a number of terms from the particular language greater than the number of terms from the particular language in the first word set responsive to the identifying of the term from the particular language in the first textual input;
receiving second textual input via the data entry interface comprising the displayed actuatable language character elements in the particular language;
comparing the second textual input with the second word set; and
applying auto-translate to the second textual input in the particular language based on the comparing with the second word set.

5. The method of claim 4, further comprising
applying auto-correction to the second textual input in the particular language based on the comparing with the second word set.

6. An electronic messaging method implemented by one or more processors, the method comprising:
receiving first textual input by a user device from a user via a user interface of the user device;
accessing by the user device a first word set comprising terms from a plurality of languages, the plurality of languages comprising a particular language;
comparing the first textual input with the first word set to identify a term from the particular language in the first textual input;
enabling a data entry interface in the user interface comprising displayed actuatable language character elements in the particular language responsive to the identifying of the term from the particular language in the first textual input;
retrieving a second word set comprising a number of terms from the particular language greater than the number of terms from the particular language in the first word set responsive to the identifying of the term from the particular language in the first textual input;
receiving second textual input via the data entry interface comprising the displayed actuatable language character elements in the particular language;
comparing the second textual input with the second word set; and
applying auto-correction to the second textual input in the particular language based on the comparing with the second word set.

7. The method of claim 6, further comprising retrieving the second word set via a network from a network-accessible computing system.

8. The method of claim 4, further comprising:
receiving the first textual input by the user device in a first language at a first time; and
receiving the second textual input by the user device in the particular language comprising a second language at a second time via the data entry interface enabled responsive to the identifying of the term from the particular language in the first textual input.

9. An electronic messaging method implemented by one or more processors, the method comprising:
receiving first textual input by a user device from a user via a user interface of the user device;
accessing by the user device a first word set comprising terms from a first language;
comparing the first textual input with the first word set and determining at least one term of the first textual input is not included in the first word set;
retrieving a second word set comprising terms from a plurality of languages responsive to the determining the at least one term of the first textual input is not included in the first word set, the plurality of languages comprising a second language;
comparing the first textual input with the second word set to identify a term from the second language in the first textual input;
enabling a data entry interface in the user interface comprising displayed actuatable language character elements in the second language responsive to the identifying of the term from the second language in the first textual input;
retrieving a third word set comprising a number of terms from the second language greater than the number of terms from the second language in the second word set by at least a factor of two responsive to the identifying of the term from the second language in the first textual input;
receiving by the user device second textual input via the data entry interface comprising the displayed actuatable language character elements in the second language;
comparing the second textual input with the third word set;
applying auto-correction to the second textual input in the second language based on the comparing the second textual input with the third word set; and
displaying via the user interface corrected text of the second textual input.

10. The method of claim 9, further comprising providing the data entry interface as a keyboard including characters of the second language.

11. The method of claim 9, further comprising:
providing the data entry interface as at least one keyboard comprising characters of the first language and the second language; and
applying the auto-correction to the second textual input in the first language.

12. An electronic messaging method implemented by one or more processors, the method comprising:
receiving first textual input by a user device from a user via a user interface of the user device;
accessing by the user device a first word set comprising terms from a first language;
comparing the first textual input with the first word set and determining at least one term of the first textual input is not included in the first word set;
retrieving a second word set comprising terms from a plurality of languages responsive to the determining the at least one term of the first textual input is not included in the first word set, the plurality of languages comprising a second language;
comparing the first textual input with the second word set to identify a term from the second language in the first textual input;
enabling a data entry interface in the user interface comprising displayed actuatable language character elements in the second language responsive to the identifying of the term from the second language in the first textual input;
retrieving a third word set comprising a number of terms from the second language greater than the number of terms from the second language in the second word set by at least a factor of two responsive to the identifying of the term from the second language in the first textual input;
receiving by the user device second textual input via the data entry interface comprising the displayed actuatable language character elements in the second language;
comparing the second textual input with the third word set;
applying auto-translate to the second textual input in the second language based on the comparing the second textual input with the third word set to translate from the second language to the first language; and
displaying via the user interface translated text of the second textual input.

13. The method of claim 12, further comprising:
receiving, by the user device via the user interface an indication of a particular message recipient at a particular phone number;
determining based on at least one of the first word set, the second word set, or the third word set that a number of terms of at least one of the second textual input or stored textual communication between the user and the particular message recipient in the first language are greater than a number of terms of the at least one of the second textual input or the stored textual communication between the user and the particular message recipient in the second language; and
applying the auto-translate based at least on the determining that the number of terms of the at least one of the second textual input or the stored textual communication between the user and the particular message recipient in the first language are greater than the number of terms of the at least one of the second textual input or the stored textual communication between the user and the particular message recipient in the second language.

14. The method of claim 12, further comprising:
determining based on at least one of the first word set, the second word set, or the third word set a number of terms of at least one of the second textual input or stored textual communication between the user and a particular message recipient in the first language and a number of terms of the at least one of the second textual input or the stored textual communication between the user and the particular message recipient in the second language; and
applying the auto-translate based at least on the number of terms of the at least one of the second textual input or the stored textual communication between the user and the particular message recipient in the first language and the number of terms of the at least one of the second textual input or the stored textual communication between the user and the particular message recipient in the second language.

15. The method of claim 12, wherein applying the auto-translate comprises:
transmitting by the user device via a network the second textual input to a network-accessible computing system; and
receiving translated text via the network from the network-accessible computing system.

16. The method of claim 12, wherein applying the auto-translate comprises:
retrieving via a network a translation dictionary comprising the first language and the second language; and
applying the translation dictionary to the second textual input.

17. The method of claim 16, wherein the third word set comprises translations from the second language to the first language, and applying the auto-translate comprises applying the translations from the third word set to the second textual input.

18. The method of claim 4, further comprising:
receiving by the user device via the user interface of the user device an indication of a particular message recipient at a particular phone number;
comparing the particular phone number of the particular message recipient with a listing of international calling codes and predominant languages corresponding to respective countries corresponding to the listing of international calling codes, and identifying a first language corresponding to an international calling code of the particular phone number;
comparing a message history of the user with the first word set comprising the terms from the plurality of languages, and identifying at least one term from the first language in a stored communication between the user and a party other than the particular message recipient;
enabling a user query via the user interface in response to the identifying of the at least one term from the first language and the identifying of the term from the particular language, wherein the particular language comprises a second language, and receiving a selection by the user of at least one of the first language or the second language via the user query; and
enabling the data entry interface in the user interface comprising the displayed actuatable language character elements in the at least one of the first language or the second language responsive to the selection by the user via the user query.

19. The method of claim 18, further comprising:
applying auto-correction to the second textual input in the at least one of the first language or the second language based on the second word set; and
displaying via the user interface corrected text of the second textual input.

20. The method of claim 4, further comprising:
receiving by the user device via the user interface of the user device an indication of a particular message recipient at a particular phone number;
comparing the particular phone number of the particular message recipient with a listing of international calling codes and predominant languages corresponding to respective countries corresponding to the listing of international calling codes, and identifying a first language corresponding to an international calling code of the particular phone number;
comparing a message history of the user with the first word set comprising the terms from the plurality of languages, and identifying at least one term from the first language in a stored communication between the user and a party other than the particular message recipient;
comparing a transmitted textual communication between the user and the particular message recipient with the first word set, and identifying at least one term from a second language in the transmitted textual communication between the user and the particular message recipient;
enabling a user query via the user interface in response to the identifying of the at least one term from the first language and the identifying of the at least one term from the second language, and receiving a selection by the user of at least one of the first language or the second language via the user query, the at least one of the first language or the second language comprising the particular language;
enabling the data entry interface in the user interface comprising the displayed actuatable language character elements in the at least one of the first language or the second language responsive to the selection by the user via the user query;
receiving by the user device the second textual input via the data entry interface comprising the displayed actuatable language character elements in at least one of the first language or the second language;
applying auto-correction to the second textual input in the at least one of the first language or the second language; and
displaying via the user interface corrected text of the second textual input.

21. The method of claim 20, further comprising applying the auto-correction to the second textual input based on the second word set.

22. The method of claim 4, further comprising:
applying auto-correction to the second textual input in the particular language responsive to the identifying of the term from the particular language in the first textual input.

23. The method of claim 4, wherein identifying the term from the particular language in the first textual input comprises identifying the term from the particular language a particular plurality of times, the method further comprising:
enabling a user query via the user interface in response to the identifying the term from the particular language the particular plurality of times;
receiving a selection of the particular language by the user via the user query; and
enabling the data entry interface in the user interface comprising the displayed actuatable language character elements in the particular language further responsive to the selection by the user via the user query.

24. The method of claim 23, further comprising:
retrieving the second word set further responsive to the selection by the user via the user query; and
applying auto-correction to the second textual input in the particular language based on the comparing with the second word set.

25. The method of claim 4, further comprising:
receiving by the user device via the user interface of the user device an indication of a particular message recipient at a particular phone number;
comparing the particular phone number of the particular message recipient with a listing of international calling codes and predominant languages corresponding to respective countries corresponding to the listing of international calling codes, and identifying a first language corresponding to an international calling code of the particular phone number;
enabling a user query via the user interface in response to the identifying of the first language and the identifying of the term from the particular language, wherein the particular language comprises a second language, and receiving a selection by the user of at least one of the first language or the second language via the user query; and
enabling the data entry interface in the user interface comprising the displayed actuatable language character elements in the at least one of the first language or the second language responsive to the selection by the user via the user query.

26. The method of claim 4, further comprising:
determining a location of the user device based on signals received by the user device;
comparing the determined location of the user device with a listing of predominant languages corresponding to respective countries corresponding to the determined location, and identifying a first language corresponding to the determined location;
enabling a user query via the user interface in response to the identifying of the first language and the identifying of the term from the particular language, wherein the particular language comprises a second language, and receiving a selection by the user of at least one of the first language or the second language via the user query; and
enabling the data entry interface in the user interface comprising the displayed actuatable language character elements in the at least one of the first language or the second language responsive to the selection by the user via the user query.

27. The method of claim 4, further comprising:
receiving by the user device via the user interface of the user device an indication of a particular message recipient;
determining a location of the user device based on signals received by the user device;
comparing the determined location of the user device with a listing of predominant languages corresponding to respective countries corresponding to the determined location, and identifying a first language corresponding to the determined location;

comparing a message history of the user with the first word set comprising the terms from the plurality of languages, and identifying at least one term from the first language in a stored communication between the user and a party other than the particular message recipient;

enabling a user query via the user interface in response to the identifying of the first language corresponding to the determined location, the identifying of the at least one term from the first language in the stored communication, and the identifying of the term from the particular language in the first textual input wherein the particular language comprises a second language, and receiving a selection by the user of at least one of the first language or the second language via the user query; and enabling the data entry interface in the user interface comprising the displayed actuatable language character elements in the at least one of the first language or the second language responsive to the selection by the user via the user query.

28. An electronic messaging system comprising a user device comprising at least one hardware processor and at least one non-transitory computer-readable storage medium coupled to the at least one hardware processor and storing programming instructions for execution by the at least one hardware processor, wherein the programming instructions, when executed, cause the user device to perform operations comprising:

receiving textual input via a user interface of the user device;

accessing a first word set comprising terms from a plurality of languages, the plurality of languages comprising a first language;

comparing the textual input with the first word set, and identifying a particular term from the first language in the textual input based on the comparing of the textual input with the first word set;

identifying a plurality of terms from a second language in the textual input;

retrieving via a network a second word set responsive to the identifying of the particular term from the first language in the textual input, the second word set comprising a number of terms from the first language greater than the number of terms from the first language in the first word set and a dictionary comprising at least the first language and the second language;

comparing the textual input with the second word set;

applying auto-correction to the textual input in the first language based on the comparing with the second word set;

displaying via the user interface corrected text of the textual input;

applying auto-translate to the textual input to translate at least one term of the textual input from the first language to the second language based on the second word set and based on the identifying of the particular term from the first language in the textual input and the identifying of the plurality of terms from the second language in the textual input; and displaying via the user interface translated text of the textual input.

29. The electronic messaging system of claim 28, wherein the programming instructions, when executed, further cause the user device to perform operations comprising enabling responsive to the identifying of the particular term from the first language in the textual input a user data entry interface in the user interface comprising displayed actuatable language character elements in the first language.

30. The electronic messaging system of claim 28, wherein the programming instructions, when executed, cause the user device to retrieve the second word set from a network accessible computer server.

31. The electronic messaging system of claim 28, wherein the programming instructions, when executed, further cause the user device to perform operations comprising:

identifying a particular term from the second language of the plurality of languages in the textual input based on the comparing of the textual input with the first word set;

retrieving via the network a third word set comprising a number of terms from the second language greater than the number of terms from the second language in the first word set responsive to the identifying of the particular term from the second language in the textual input;

comparing the textual input with the third word set; and applying the auto-correction to the textual input in the second language based on the comparing with the third word set.

32. The electronic messaging system of claim 28, wherein the programming instructions, when executed, further cause the user device to perform operations comprising applying the auto-correction to at least one of:

correct a misspelled word in the textual input;

display user-selectable words for replacing the misspelled word in the textual input;

complete a partially inputted word in the textual input; or display user-selectable words for completing the partially inputted word in the textual input.

33. An electronic messaging method implemented by one or more processors, the method comprising:

receiving textual input by a user device from a user via a user interface of the user device;

identifying a plurality of terms in a first language in the textual input;

identifying at least one term in a second language in the textual input;

determining a number of terms in the first language in the textual input and a number of terms in the second language in the textual input;

translating the at least one term in the second language to generate at least one translated term in the first language based on the identifying of the plurality of terms in the first language and the identifying of the at least one term in the second language and based on the number of terms in the first language in the textual input and the number of terms in the second language in the textual input; and displaying the at least one translated term in the first language via the user interface.

* * * * *